(12) United States Patent
Ampezzan

(10) Patent No.: US 10,973,239 B2
(45) Date of Patent: Apr. 13, 2021

(54) APPARATUS FOR PASTEURIZING AN AMOUNT OF ICE CREAM

(71) Applicant: Valerio Ampezzan, Sundern (DE)

(72) Inventor: Valerio Ampezzan, Sundern (DE)

(*) Notice: Subject to any disclaimer, the term of this patent is extended or adjusted under 35 U.S.C. 154(b) by 0 days.

(21) Appl. No.: 16/728,299

(22) Filed: Dec. 27, 2019

(65) Prior Publication Data

US 2020/0128851 A1 Apr. 30, 2020

Related U.S. Application Data

(63) Continuation of application No. PCT/EP2018/066448, filed on Jun. 20, 2018.

(30) Foreign Application Priority Data

Jun. 30, 2017 (DE) .......................... 102017114684.9

(51) Int. Cl.
*A23G 9/22* (2006.01)
(52) U.S. Cl.
CPC ..................................... *A23G 9/22* (2013.01)
(58) Field of Classification Search
CPC .. A47J 31/4485; A47J 31/4489; A47J 31/461; A47J 31/60; A23G 9/22; A21B 3/04; A21B 5/00

USPC ......... 99/282, 283, 293, 324, 403, 453, 467; 219/401, 441, 481, 491, 496, 506, 508, 219/516, 533

See application file for complete search history.

(56) References Cited

U.S. PATENT DOCUMENTS

| 6,244,163 B1* | 6/2001 | Lee ..................... A47J 37/0623 219/400 |
| 2005/0112255 A1* | 5/2005 | Tottenham ................ A61L 2/24 426/511 |
| 2014/0199455 A1* | 7/2014 | Bilet ........................ A23L 5/13 426/510 |

FOREIGN PATENT DOCUMENTS

| DE | 102006054215 A1 | 2/2008 |
| EP | 0245641 A1 | 11/1987 |
| EP | 2279669 A2 | 2/2011 |

* cited by examiner

*Primary Examiner* — Phuong T Nguyen
(74) *Attorney, Agent, or Firm* — Edell, Shapiro & Finnan, LLC

(57) ABSTRACT

An apparatus for pasteurizing an ice cream composition comprises a receptacle for receiving the ice cream composition, a steam generator, and a steam line. The steam generator is designed to generate water vapor, the steam line is designed to conduct the generated water vapor into the receptacle. The steam line has a heatable heating section designed to increase the temperature of the steam. The heating section is arranged outside the steam generator.

8 Claims, 3 Drawing Sheets

APPARATUS FOR PASTEURIZING AN AMOUNT OF ICE CREAM

CROSS REFERENCE TO RELATED APPLICATIONS

This application is a continuation of International Application No. PCT/EP2018/066448, filed on Jun. 20, 2018, which claims priority under 35 U.S.C. § 119 to Application No. DE 102017114684.9 filed on Jun. 30, 2017, the entire contents of which are hereby incorporated by reference.

TECHNICAL FIELD

The present disclosure relates to an apparatus for pasteurizing an ice cream composition.

BACKGROUND

Apparatuses for pasteurizing an ice cream composition with water vapor are known from the prior art. German Patent No. DE 697 27 428 T2, for example, discloses such an apparatus. In addition, an apparatus for pasteurizing food is also known from the German Patent No. DE 10 2010 003 563 A1, where the water vapor that is used is reheated in order to reduce the moisture that is introduced into the food with the water vapor.

In contrast to the aforesaid, an object of the disclosed apparatus is to heat the water vapor in a better way.

SUMMARY

The disclosed apparatus comprises a receptacle for receiving an ice cream composition. The apparatus may comprise preferably a coolant that is designed to cool the receptacle. The apparatus also comprises a steam generator and a steam line. The steam generator is designed to generate water vapor. The steam line is designed to conduct the generated water vapor into the receptacle. The steam line has a heatable heating section designed to raise the temperature of the steam. In accordance with the disclosed apparatus, the heating section is arranged outside the steam generator.

The arrangement of the heating section outside of the steam generator has the advantage that the heating section is not cooled by the water inside the steam generator. The heat that is generated is used solely to heat the steam inside the steam line. The heating section is designed preferably to heat the steam to at least 300° C., preferably 400° C. or even 500° C. It is also possible for the steam line to have a plurality of such heating sections.

In accordance with one implementation of the disclosed apparatus, the heating section may be designed to be directly heatable. In the context of this description this means, in particular, that the steam line itself is heated, for example, by an electric current. This differs from an indirect heating with heating coils that are in contact with the heating section, as is known from DE 10 2010 003 563 A1.

In accordance with one implementation of the disclosed apparatus, the heating section may have a plurality of turns. These turns may be, in particular, concentric and have the same diameter. The turns make the distance that the steam travels through the heating section longer, so that reliable heating is achieved.

In accordance with one implementation of the disclosed apparatus, the apparatus may have an arm that projects into the receptacle. The steam line may run at least partially inside the arm. It is particularly advantageous, if the steam issues from the steam line at the end of the arm. The arm may be, in particular, pivotable, raisable and/or lowerable, so that it can be pivoted into the receptacle or lowered into the receptacle.

In accordance with one implementation of the disclosed apparatus, the steam line may have an outlet end from which the steam issues into the receptacle during operation of the apparatus. The apparatus may comprise various attachments that can be mounted on the outlet end. In this way, varying streams of water vapor inside the ice cream composition can be achieved.

When the steam is discharged from the steam generator and issues from the outlet end, the pressure in the steam generator decreases. In order to keep the pressure constant or to increase the pressure, it is possible to provide breaks when the steam is blown off. The length of the breaks may be, for example, less than one second.

In accordance with one implementation of the disclosed apparatus, the attachments may comprise a rotatable attachment. The rotatable attachment can be set in rotation, when the water vapor issues from the outlet end. In this way, an advantageous distribution of the water vapor inside the ice cream composition is achieved.

In accordance with one implementation of the disclosed apparatus, the apparatus may be designed to prevent the ice cream composition from penetrating into the steam line through the outlet end due to steam pulses. For example, water vapor may be emitted through the outlet end at regular or irregular intervals for a period of a few milliseconds up to half a second, if no pasteurization is to be carried out. Consequently under some circumstances an ice cream composition that has entered the steam line is pumped back into the receptacle. In so doing, the ice cream composition is not heated too much.

In accordance with one implementation of the disclosed apparatus, the apparatus may comprise a shelf for the receptacle, on which the receptacle stands during operation of the apparatus. The shelf may be raisable and lowerable. In this way the receptacle may be put on the shelf in a particularly convenient manner when the shelf is lowered. Then the shelf may be raised, so that the outlet end of the steam line projects far enough into the receptacle.

In accordance with one implementation of the disclosed apparatus, the apparatus may comprise an additional hose-like steam line with an outlet nozzle. The water vapor, which is generated in the steam generator, may be released to the environment through the additional steam line. The outlet nozzle may be used, for example, for cleaning articles and/or floors and/or walls.

In accordance with one implementation of the disclosed apparatus, the apparatus may comprise an operating mechanism, to which the outlet nozzle of the additional steam line is attached. The operating mechanism may be designed to be movable relative to the steam generator and/or to the receptacle. In particular, it is possible for the operating mechanism to move freely in a space inside the radius defined by the additional steam line. Articles, floors and walls can be cleaned with the operating mechanism in a particularly convenient manner.

It is possible that the steam generator comprises a receptacle, in which water is stored. This water is heated to produce steam. When the water is no longer needed, the water may be drained from the steam generator. This may take place, for example, through the outlet end. The advantage is that the steam line is cleaned with the water. In addition, components of the apparatus that can be cleaned by the water that flows out may be held under the outlet end.

It is also possible for the water that is no longer required to be drained from the steam generator via nozzles that are directed towards components of the apparatus that come into contact with the ice cream composition during use. These components may be, for example, the arm, projecting into the receptacle, and/or the outlet end.

BRIEF DESCRIPTION OF THE DRAWINGS

Other features and advantages of the disclosed apparatus will become apparent from the following description of example embodiments with reference to the accompanying drawings, which show in.

DETAILED DESCRIPTION

Figure 1:
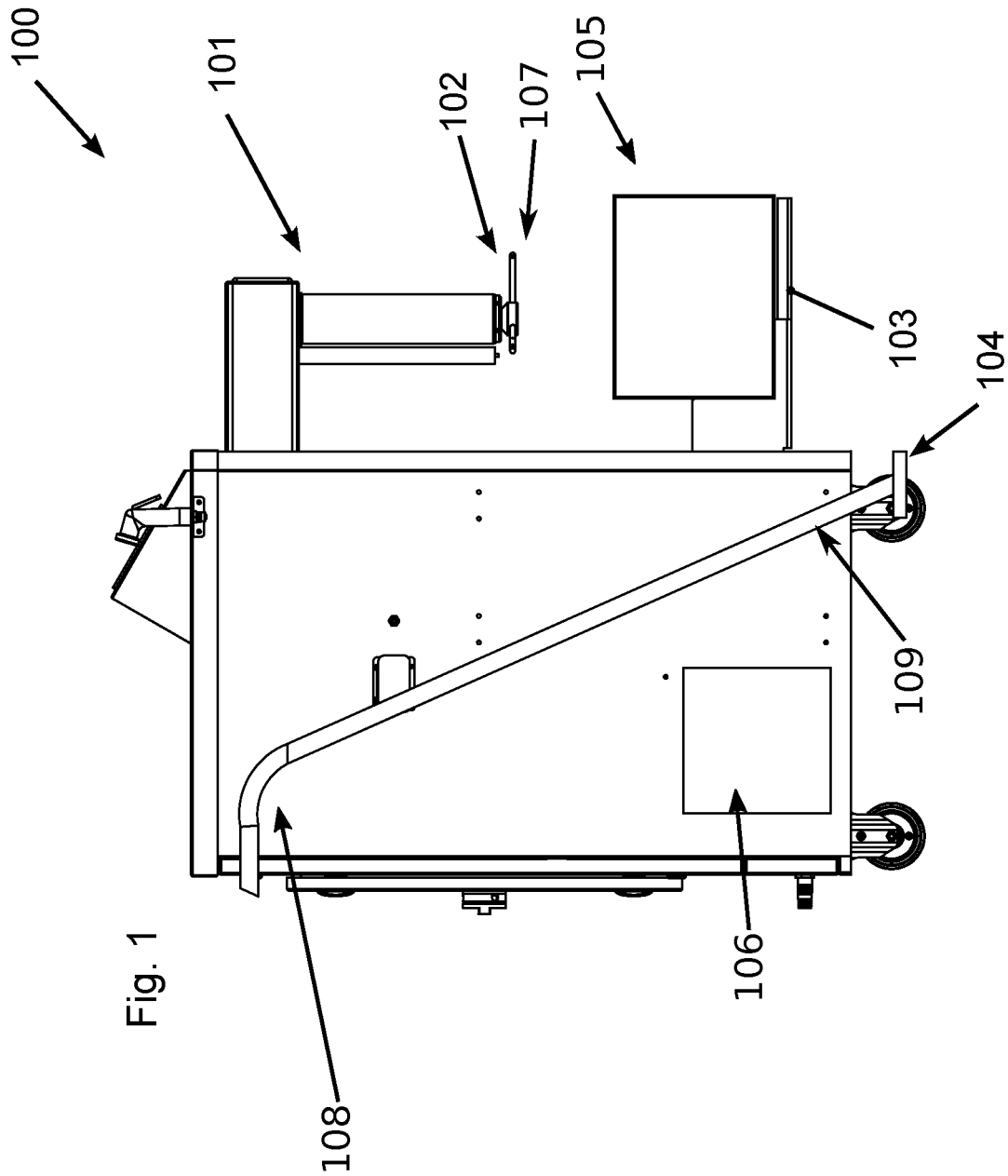
FIG. 1 is in schematic form a side view of an apparatus in accordance with one implementation of the disclosed apparatus.

An apparatus 100 comprises a receptacle 105 (shown in FIG. 1) that can be placed on a shelf 103 of the apparatus. When the receptacle stands on the shelf 103, an outlet end 102 of a steam line projects into the receptacle. The shelf can be preferably raised and lowered, so that it can be raised until the outlet end 102 projects into the receptacle. The outlet end 102 is disposed on an arm 101 that extends away from a housing of the apparatus 100. A steam generator 106 is arranged inside the housing.

A steam line 301 (shown in FIG. 3) runs from the steam generator 106 through the arm 101 to the outlet end 102, so that water vapor, generated in the steam generator, can flow through the steam line to the outlet end 102, where the steam is used to pasteurize an ice cream composition disposed in the receptacle.

The arm 101 may be designed to be pivotable and/or to be raisable and lowerable. This feature is advantageous in order to position the arm 101 in the receptacle 105 and to remove the receptacle from the shelf 103. The arm 101 can be lowered, for example, when the receptacle is arranged on the shelf 103. When the receptacle 105 is to be removed, the arm 101 can be raised or pivoted, so that it no longer projects or no longer projects so far into the receptacle.

Attachments 107, 302 are arranged at the outlet end 102, and one of the attachments 107 in turn has a plurality of openings (shown in FIG. 3) so that water vapor, issuing from the outlet end, sets the attachment 107 in rotation and exits the attachment through the openings. In this way a particularly uniform distribution of the water vapor in the ice cream composition is achieved.

Moreover, the apparatus also has an additional steam line 108 with an outlet nozzle 104. The additional steam line is designed to transport water vapor from the steam generator 106 inside the housing to the outlet nozzle 104. The outlet nozzle 104 may be moved with an operating mechanism which is configured as an elongated conduit 109, as shown in FIG. 1, over surfaces to be cleaned, so that the apparatus is also suitable for cleaning a surface.

Figure 2:
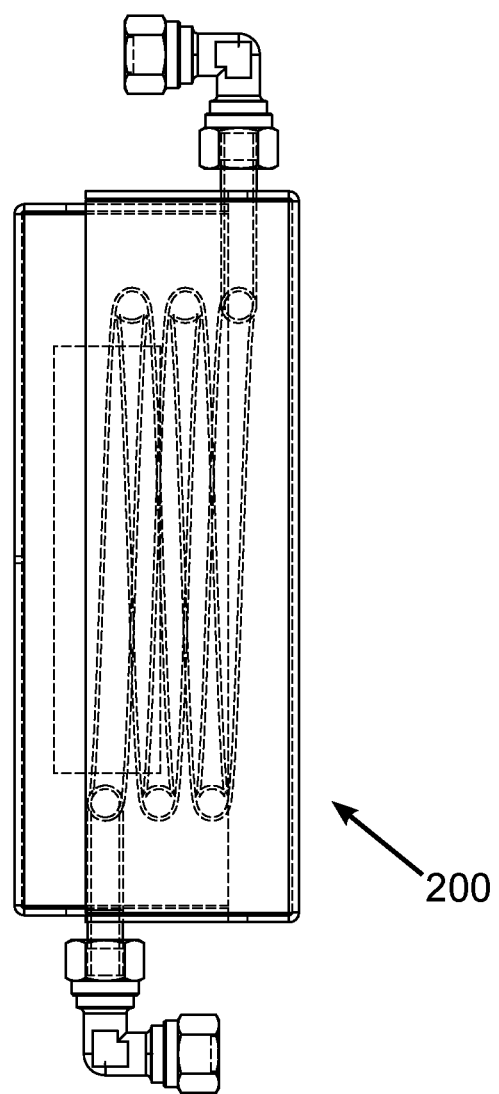
FIG. 2 is in schematic form a side view of a heating section of a steam line.

The steam line 301, which runs from the steam generator 106 to the outlet end 102, comprises a heating section 200, which is shown in FIG. 2. In this heating section the water vapor is heated to several hundred degrees Celsius, so that the relative moisture of the mixture of air and water is reduced, and less moisture is introduced into the ice cream composition.

The heating section 200 has a plurality of concentric turns of the same diameter so that the water vapor travels a relatively long distance in the heating section, although the installation space required therefor is comparatively small. The heating section 200 can be heated preferably directly, for example, electrically.

Figure 3:
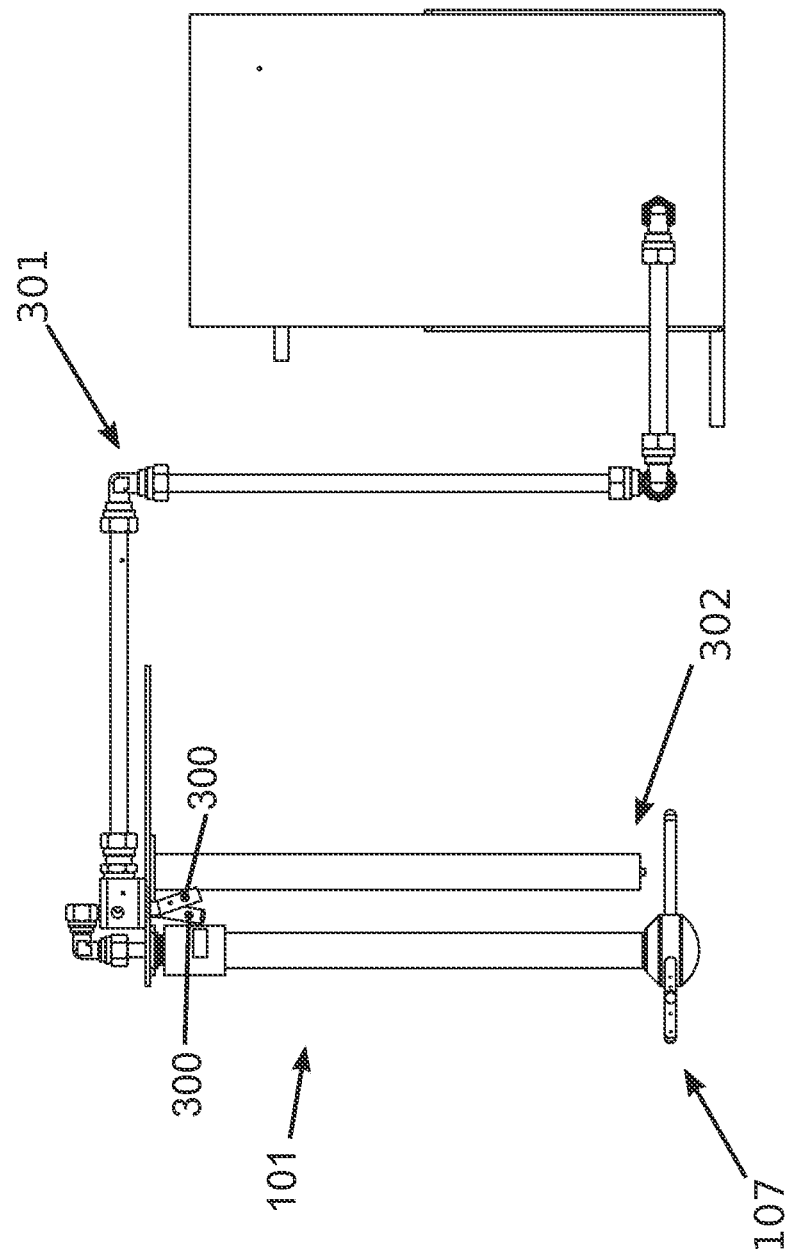
FIG. 3 is in schematic form a side view of an apparatus in accordance with one implementation of the disclosed apparatus with additional nozzles.

The apparatus, shown in FIG. 3, comprises nozzles 300 that are directed towards components of the apparatus that can come into contact with the ice cream composition during use. These components are, in particular, the arm 101 and the feed lines to the outlet end 102. Water may be drained from the steam generator through the nozzles 300, when it is no longer needed to generate steam. Then the water impinges on the components of the arm 101 and cleans them.

What is claimed is:

1. An apparatus for pasteurizing an ice cream composition, comprising:
    a receptacle to receive the ice cream composition;
    a steam generator to generate water vapor; and
    a steam line to conduct the water vapor into the receptacle, the steam line including a heatable heating section to increase the temperature of the steam, wherein the heating section is arranged outside the steam generator,
    wherein the steam line has an outlet end from which the steam issues into the receptacle during operation of the apparatus, and
    wherein the apparatus further comprises attachments mountable on the outlet end, and the attachments comprise a rotatable attachment, the rotatable attachment being set in rotation in response to the water vapor issuing from the outlet end.

2. The apparatus of claim 1, wherein the heating section of the steam line is directly heatable.

3. The apparatus of claim 1, wherein the heating section has a plurality of turns.

4. The apparatus of claim 1, further comprising an arm that projects into the receptacle, wherein the steam line runs at least partially inside the arm.

5. The apparatus of claim 1, wherein the apparatus is configured to impede the ice cream composition from penetrating into the steam line through the outlet end via steam pulses.

6. The apparatus of claim 1, further comprising a shelf to support the receptacle, wherein the shelf is capable of being raised and lowered towards and away from the outlet end.

7. The apparatus of claim 1, further comprising an additional hose-like steam line with an outlet nozzle through which the water vapor generated in the steam generator is releasable to the environment.

8. The apparatus of claim 7, further comprising an operating mechanism configured as an elongated conduit to which the outlet nozzle is attached, the operating mechanism being movable relative to the steam generator and to the receptacle.

* * * * *